Feb. 2, 1965  R. L. MALOBICKY ETAL  3,168,391
TREATING GLASS SHEETS
Filed Jan. 12, 1961  2 Sheets-Sheet 1
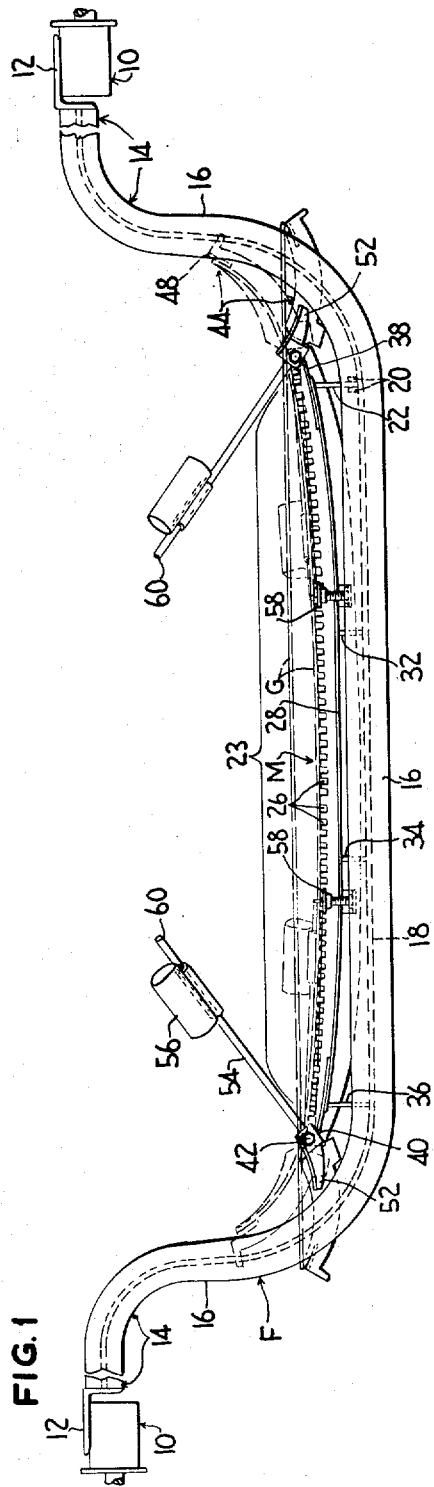
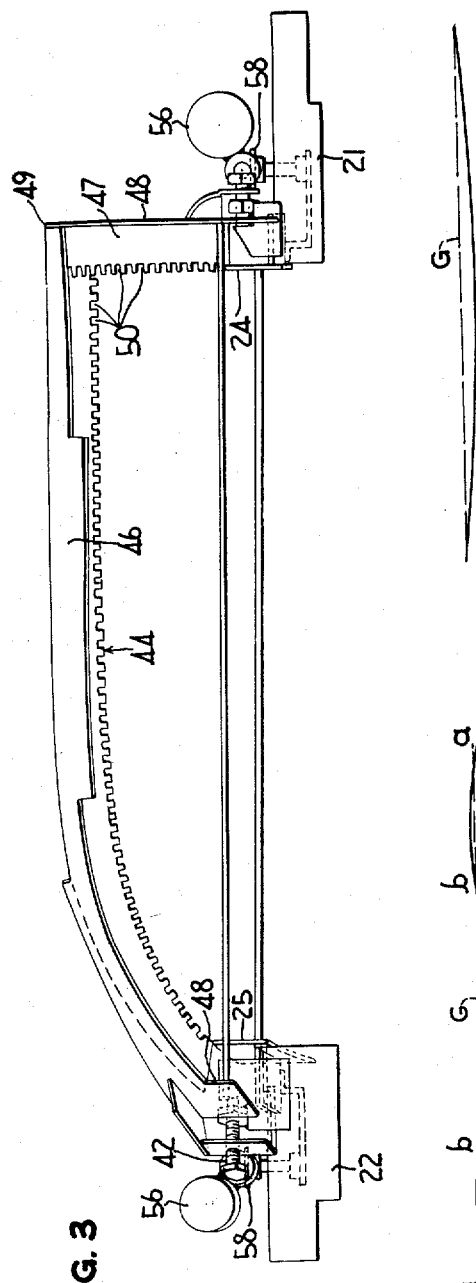
FIG. 6
FIG. 5
INVENTORS
RUDOLPH L. MALOBICKY and
HERBERT W. BARCH
BY
Oscar L. Spencer
ATTORNEY Feb. 2, 1965    R. L. MALOBICKY ETAL    3,168,391
TREATING GLASS SHEETS
Filed Jan. 12, 1961    2 Sheets-Sheet 2
FIG. 2
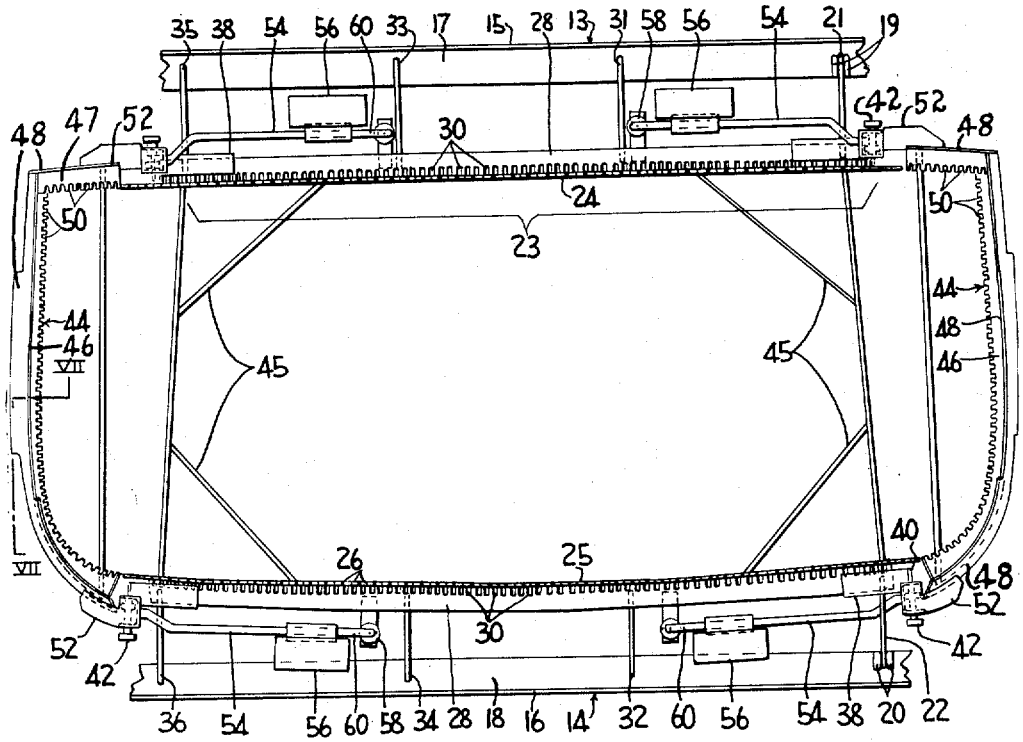
FIG. 8    FIG. 7
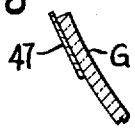    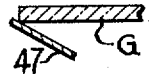
FIG. 4
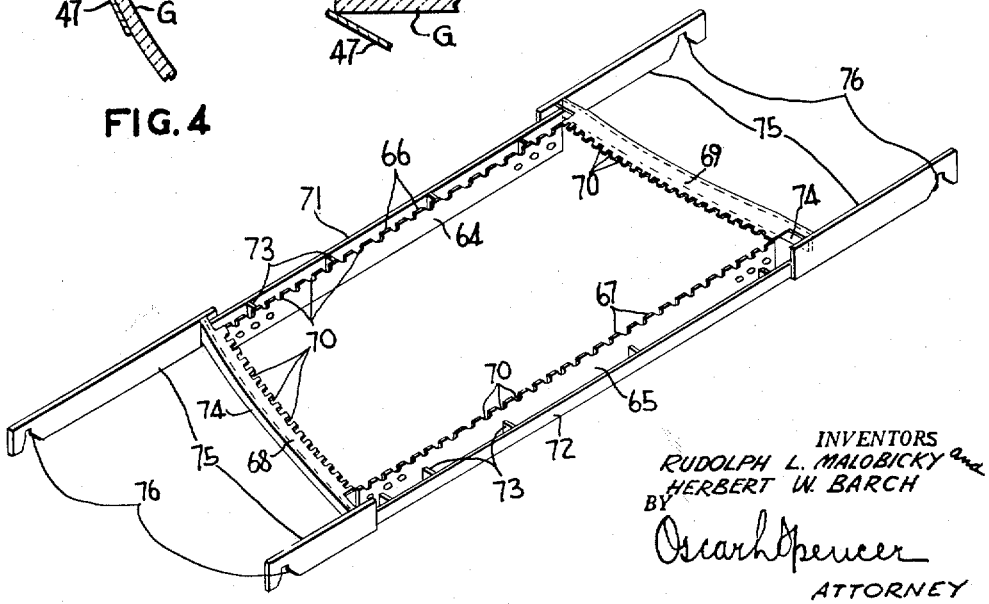
INVENTORS
RUDOLPH L. MALOBICKY and
HERBERT W. BARCH
BY Oscar Spencer
ATTORNEY

United States Patent Office 3,168,391
Patented Feb. 2, 1965

3,168,391
TREATING GLASS SHEETS
Rudolph L. Malobicky, Tarentum, and Herbert W. Barch, Natrona Heights, Pa., assignors to Pittsburgh Plate Glass Company, Pittsburgh, Pa., a corporation of Pennsylvania
Filed Jan. 12, 1961, Ser. No. 82,246
1 Claim. (Cl. 65—107)

This application relates to treating glass sheets, and specifically refers to a method and apparatus for bending glass sheets to longitudinal bends in which the apparatus comprises novel means to minimize reverse sag in a direction transverse to the longitudinal bend that always accompanies such a bending operation.

When a glass sheet is bent along its longitudinal dimension, it is subject to a stress parallel to its length. The glass sheet compensates for this longitudinal distortion to some extent by developing a lateral contraction. This lateral contraction is a function of the magnitude of the longitudinal stress imposed on the glass to cause it to bend. The compensating transverse stress imposed in the glass distorts the glass sheet transversely of its longitudinal direction in such a manner that the bent sheet tends to warp in its transverse dimension in a direction opposite that imposed longitudinally. This factor imparts a caved-in appearance across its transverse dimension. This appearance is undesirable for aesthetic reasons and may result in an unsalable product if sufficiently severe.

Glass sheets are presently bent for mass production by a heat-sagging technique. This operation employs skeletonized, sectionalized glass bending molds having upper edge surfaces of concave elevation. The sections are rotated relative to each other between a spread mold position for supporting a flat glass sheet preparatory to bending to a closed mold position wherein the upper edge surfaces of the mold sections provide a substantially continuous outline shaping surface conforming to the shape desired for the bent glass sheet. Each of the mold sections comprises one or more rails having a thickness of between about .06 inch to about .20 inch and a width of between about 2 inches and 1 inch, respectively, disposed edgewise with their upper edges forming the different portions of the glass sheet shaping surface.

Glass sheets are mounted on skeletonized molds and conveyed through a hot atmosphere comprising radiant heaters that radiate heat of sufficient intensity to cause the glass to reach its softening point and sag to conform to the mold shaping surface. After the glass is bent, it is cooled rapidly if the bent sheet is to be tempered, or gradually under controlled cooling conditions if the bent sheet is to be annealed.

Prior art skeletonized molds comprise either a single continuous rail disposed edgewise for shallow bends or sectionalized molds for sharp or complicated bends. Means are provided on some molds to apply mechanical force to accelerate the longitudinal bend imposed in the glass sheet.

When a glass sheet is mounted on a mold for bending, its own weight tends to induce its downward sagging. The length of the unsupported span of glass between support points provided by the mold determines its amount of downward sagging. This downward sagging occurs in a transverse direction as well as in a longitudinal direction. The sag along an axis extending transversely of the sheet is termed "transverse sag" by those in the art.

The distortion resulting from the compensating transverse stress mentioned above is not produced in the same location as its transverse sag and is usually of different magnitude. Therefore, the lateral stress tending to warp the sheet convexly in transverse cross-section in response to conforming its longitudinal dimension to a concave shaping surface does not compensate for its transverse concave sag due to gravity. Instead, the glass is likely to develop a wavy appearance along its lateral dimension. This wavy appearance results from a combination of the natural downward sag of the unsupported transverse dimension of the glass and the transverse warp resulting from the forces compensating for the longitudinal stresses imposed in the glass bent longitudinally.

The above problems are further complicated by the fact that when a glass sheet is supported on a very narrow marginal edge of a skeletonized mold, its peripheral edge extends beyond the outline defined by the skeletonized mold. Otherwise, the glass sheet would tend to fall off the mold in case it is misaligned. Glass sheets extending beyond the outline shaping surface tend to sag downwardly about their margin. This downward marginal sag is a function of the duration of exposure of the glass softening temperature while supported inwardly of its marginal edge and the width of the marginal edge outwardly of the line of support.

The reverse sag about the margin or "overlipping" makes it very difficult to install a bent glass sheet in its proper location in an automobile frame. It is necessary that the glass sheets be bent along their marginal edge portions in a smooth longitudinal curve. The present invention avoids the need for supporting the flat glass inwardly of its marginal edge, thus minimizing reverse marginal sag.

It has been proposed to bend glass sheets by utilizing complementary convex and concave pressing molds to avoid the problems stated above. However, complementary pressing members impose marks on the viewing surfaces of the glass sheet and, therefore, are objectionable for this reason.

Another suggested solution is to employ in skeleton molds relatively wide oblique shaping surfaces which make contact only with the bottom edge corner of the entire peripheral margin of the glass sheets, as taught in U.S. Patent No. 2,633,673 to Bamford and Jendrisak. However, undesirable tension stresses result from using such constructions capable of maintaining the glass bottom corner edge only in continuous contact with the mold shaping surface throughout the bending cycle as recited in said patent. The present invention arises from the determination that these undesirable tension stresses result from employing shaping surface members of a thickness such that their thermal capacity is sufficiently greater than that of the supported marginal glass sheet edge portion to retard the heating and cooling rates of the marginal edge portion during the thermal cycle characteristic of bending and annealing or of bending and tempering.

Such thick obliquely disposed shaping surfaces maintain the glass marginal edge relatively stiff while the portion inwardly of the margin distorts to locate the reverse sag transversely inwardly of the bent glass sheet margin. Therefore, an oblique shaping surface of sufficient thickness to develop bottom edge corner contact develops the same downward marginal sag in the areas contacting the shaping surface for a considerable portion of the bending cycle as occurs using edgewise disposed rails.

The present invention minimizes the reverse transverse curvature inherent in the bent glass sheets and the downward marginal sag resulting from prior art bending practices by providing a novel technique for the bending process. According to the present invention, the mold sections are so constructed that the rail portions supporting the bent sheet margin adjacent its axis of sharpest curvature are disposed flatwise and constructed sufficiently thin and having characteristics sufficiently similar to those of a black body to provide a reradiating surface that heats the supported and adjacent marginal edge portions of the glass sheet more quickly than the internal portions of the sheet and promotes sagging in the desired or concave direction. Therefore, the critical portion of the marginal edge of the glass sheet is sagged downwardly initially at a faster rate than that of other interior regions so that the marginal edge portion of the glass sheet comes into flatwise contact with the critical portion of the shaping surface. The latter is defined to cover both the relatively sharply curved regions of the shaping surface and those portions in contact with the bent glass sheet for a substantial portion of the bending cycle. The flatwise support prevents reverse marginal sag and, therefore, promotes easy installation of the bent glass sheet in a frame. The flatwise support also serves to help establish compression stress in the edge portion when the critical portion of the shaping surface is constructed within the thickness tolerances of the present invention.

When the flatwise disposed portion of the mold shaping surface is constructed of sufficiently thin material to cool more rapidly than the marginal edge portion of the glass sheet in flatwise contact therewith, the shaping surface withdraws heat from the contacted marginal edge portion of the bent glass sheet during the cooling phase following bending when the bent glass is either annealed or tempered. This causes the contacted portion of the glass sheet to cool at a more rapid rate than the inner portion of the glass so as to impose a marginal compressive stress therein.

According to the present invention, the thickness of the flatwise disposed rail portions is sufficiently less than the thickness of the supported glass to enable the flatwise disposed rail portion to have a thermal capacity substantially less than that of the adjacent portion of the glass sheets. Therefore, the temperature of the relatively thin portion of the shaping rail initially increases at a faster rate than that of the supported glass sheet adjacent thereto during the heating portion of the bending cycle and initially decreases at a faster rate than that of the portion of the glass sheet in contact therewith during the cooling subsequent to bending.

As a consequence, when the glass sheet and its supporting mold are exposed to a cooler atmosphere after the glass sheet contacts the shaping surface and assumes the bent shape thereof and is in marginal contact therewith, the shaping surface cools to a temperature less than that of the glass sheet and thus abstracts heat from the portion of the glass sheet in contact therewith. The glass sheet marginal portion in flatwise contact with the shaping surface thereby cools more rapidly than the portion of the glass sheet inwardly of said contacted marginal portion.

The laterally inner margin of the flatwise disposed portion of the shaping surface is either serrated or apertured. This increases the surface area of the critical portion of the shaping surface exposed to the atmosphere of the bending operation, thus increasing its heating and cooling rates, which control the effective heating and cooling rates of the marginal edge portion of the glass sheet, in response to a change in ambient temperature. The apertures or serrations are also beneficial in tempering by providing access for the chilling blasts of tempering fluid onto the bottom surface of the glass sheet edge.

In order to understand the present invention more clearly, certain embodiments of the present invention will be described.

In the drawings which form part of the present disclosure and wherein reference characters are referred to as similar elements throughout the figures, FIG. 1 is a front elevation of a sectionalized mold showing the mold in the open mold position in solid lines and in the closed mold position in phantom;

FIG. 2 is a plan view of the mold in its closed mold position;

FIG. 3 is an end view of the mold shown in FIGS. 1 and 2; and

FIG. 4 is a perspective view of an alternate embodiment of the present invention showing a continuous skeleton mold construction;

FIG. 5 is a sketch of a transverse section of a glass sheet showing how a composite of gravity sagging and reverse transverse curvature and edge drooping results from bending on prior art molds;

FIG. 6 is a schematic, idealized transverse cross-section of a glass sheet bent on a mold constructed according to the teaching of the present invention.

FIG. 7 is an enlarged fragmentary section view along the lines VII—VII of FIG. 2 showing the relationship of the bottom edge corner of an edge portion of a flat glass sheet to the mold shaping surface when the flat glass sheet is mounted preparatory to bending on a sectionalized mold such as depicted in FIG. 1;

FIG. 8 is a view similar to FIG. 7 showing the flatwise relationship of the edge portion of the glass sheet to the shaping surface after the glass sheet has been bent to its desired configuration.

Referring to the drawings, reference number 10 refers to the stub rolls of a stub roll conveyor which supports the opposite longitudinal extremities of a carriage frame F. The latter comprises a pair of transverse extending angle irons 12 adapted to ride along the stub rolls 10 and interconnecting the angle irons is a pair of elongated curved members 13 and 14 comprising vertically oriented curved plates 15 and 16 (FIG. 2) which define the outer portion of the carriage frame F and horizontally oriented curved ledges 17 and 18 extending inwardly from the vertically oriented curved plates 15 and 16. A pair of lugs 19 and 20 are fixed to the horizontally oriented curved ledges 17 and 18, respectively, to provide means for receiving a pair of vertical plates 21 and 22, respectively, disposed laterally opposite each other for aligning a mold M in proper position relative to the carriage frame F.

The mold M comprises a center mold section 23 comprising a pair of longitudinally extending center section rails 24, 25, disposed edgewise and having upper serrated edges 26 (FIG. 1) conforming to the shape desired for the glass sheet adjacent its longitudinal side edges.

A horizontally disposed curved rail 28 is attached to each of the center section rails 24 and 25 by spot welding to the center of the center section rail to improve its structural rigidity. The location of the welding spots is carefully selected to minimize mold rail warpage when the mold rail is structurally reinforced.

Each of the longitudinally extending horizontally disposed curved rails 28 is provided with apertures 30 along its laterally inner edge. These apertures minimize the transfer of thermal energy from the reinforcing rails 28 to the glass through the center section rails 24 and 25.

Vertical plates 21 and 22 are rigidly connected at their upper inner edges to the bottom surface of rails 28. Additional vertical plates 31, 32, 33, 34, 35, and 36 are connected in similar fashion to the bottom surface of rails 28. All of the plates 21, 22, 31, 32, 33, 34, 35, and 36 are supported by the carriage frame F, with ledge 17 supporting the bottom edges of vertical plates 21, 31, 33, and 35 and ledge 18 supporting the bottom edges of plates 20, 32, 34, and 36.

Each curved rail 28 supports a plate 38 near each of its longitudinal extremities. Each of the plates 38 supports a bracket 40 which carries a pivot 42. Each pair of laterally opposite pivots 42 provide a pivotal connection for pivotally connecting each end mold section 44 to the center mold section 23. Cross bracing 45 interconnects rails 24 and 25 to insure that their lateral spacing from one another does not vary.

The end mold section 44 comprises a flatwise disposed curved rail section 46 extending arcuately generally transversely of the mold and a short flatwise disposed rail section 47 extending longitudinally a short distance beyond either longitudinal extremity of center section rail 24. Rail sections 46 and 47 are reinforced by a vertical rail 48 extending downwardly from its outer edge. The inner edge of each curved rail section 46 and straight rail section 47 is provided with apertures or serrations 50. Rail sections 46 and 47 are joined to each other at a corner 49.

Each innermost extremity of the end mold section 44 has its vertical reinforcing rail 28 attached to an inwardly extending bracket 52 pivotally mounted to the pivot 42. An elongated arm 54 extends longitudinally inwardly of the bracket 52 and has a weight 56 attached adjacent its inner extremity. Each of the ledges 28 has mounted thereon a pair of stop members 58 located in the path of movement taken by the longitudinally inner extremity 60 of the elongated arm 54.

Thus, one end mold section 44 extends generally transversely of the mold between one end of center mold section rail 24 to the laterally opposite end of center mold section rail 25, whereas the other end mold section 44 extends generally transversely of the mold between the other longitudinal extremity of center mold section rail 24 and the laterally opposite extremity of center mold section rail 25 when the mold is in its closed mold position. In the closed mold position depicted in phantom in FIG. 1, the upper surfaces of the flatwise disposed rail sections 46 and 47 define the sharply bent portions of the shaping surface and cooperate with the narrow upper edges 26 of center section rails 24 and 25 to provide a continuous surface having a relatively wide portion adjacent each longitudinal extremity and relatively narrow longitudinally extending side portions.

The substantially flat supporting surfaces of the flatwise disposed curved rail portions 46 support the longitudinal edges of the glass throughout the bending cycle and also reradiate some of the heat of the bending lehr into the marginal edge portion of the flat glass sheet, thus initiating sagging of the glass sheet marginal edge portion downwardly to make flatwise contact therewith. This flatwise contact avoids reverse marginal sag at the sharply bent longitudinal edges of the sheet.

A typical bending operation employing apparatus such as described above involves supporting a flat glass sheet G with its longitudinal extremities supported on the flatwise disposed rail portions 46 of the end mold section 44 and points intermediate its extremities on the longitudinal extremities of the center section rails 24 and 25. The end mold sections 44 are pivoted into the flat glass supporting position depicted in phantom in FIG. 1 to receive the flat glass sheet.

The glass laden mold is then introduced into a tunnel-like lehr where the glass is subjected to elevated temperature sufficient to soften the glass. The portion of the mold shaping surface disposed flatwise reradiates the furnace heat it receives from the furnace heating elements toward the marginal portion of the glass sheet adjacent its longitudinal extremities by virtue of the black body characteristic and the relatively small thermal capacity of the flatwise disposed rail portions 46 and 47 compared to that of the adjacent glass. This causes the marginal edge portions of the glass sheet adjacent flatwise disposed rail portions 46 and 47 to heat more rapidly than the remainder of the sheet.

The glass sheet longitudinal extremities which are in bottom edge corner contact with rail portions 46 in the flat glass position sag downwardly to flatwise contact with rail portions 46 and 47 while the end section 44 is being rotated upwardly toward the closed mold position in response to the selective softening of the glass sheet. This combination of upward lifting of the end mold sections 44 with the downward sagging along the critical marginal edge portion of the glass sheet G lifts the glass off the intermediate support points provided by the longitudinal extremities of the center section rails 24 and 25.

The temperature pattern to which the glass is exposed during the bending portion of the bending cycle involves radiating beams of relatively high temperature radiation on the portions of the glass sheet ultimately supported on the end mold sections 44 and a beam of relatively low temperature radiation on the center portion of the glass sheet ultimately supported on the center mold section 23. Therefore, the relatively hot longitudinal extremity portions of the glass sheet are subject to more heat sagging than the central portion of the glass sheet.

The glass sheet sags into contact with the flatwise disposed rail portions 46 and 47 of the upwardly lifting end mold sections 44, and the central portion of the glass sheet sags downwardly toward the upper edges 26 of the center section rails 24 and 25 which provide a curvature centrally of the sheet. When the glass is lifted off the intermediate support points provided by the longitudinal extremities of the center mold section, the glass sags toward the central portion of the mold shaping surface and makes contact with the upper edges 26 of rails 24 and 25 at their center toward the end of the period of time that the glass is subjected to elevated temperatures. The contact lines between the side edges of the glass sheet and rails 24 and 25 extend outwardly until they merge with the areas of contact with the end mold sections.

Minimizing the duration for supporting the marginal side edges of the center of the glass sheet at elevated temperatures serves to minimize the possibility of reverse marginal sag along the longitudinal side edges of the glass sheet. Supporting the marginal edge portions of the longitudinal extremities for a considerably longer duration of the bending cycle on the flatwise disposed rail portions 46 and 47 promotes positive marginal sag in the critical regions to be sharply bent.

FIGS. 5 and 6 compare the shape transversely of a glass sheet G bent longitudinally on prior art apparatus with the transverse shape of glass sheets bent on apparatus according to the present invention. In FIG. 5, the side edges *a* are shown drooping downwardly, the intermediate portions *b* curved upwardly due to the compensating reverse sag, and the central portion *c* droops downwardly due to gravity sag. Such transverse configuration is typical of the prior art. In contrast, the smooth transverse curve depicted in FIG. 6 is the desideratum of the present invention. In both FIGS. 5 and 6, the flat glass sheet is depicted in phantom for comparison.

Glass sheets bent and tempered on apparatus such as depicted in FIGS. 1 to 3 show marked superiority for reverse curvature compared to glass sheets bent and tempered on sectionalized molds whose sections were all provided with the conventional edgewise disposed rails. The transverse curvature of the longitudinally bent glass sheets bent on FIGS. 1 to 3 molds tended to appear like FIG. 6, whereas glass sheets bent on the same pattern on molds whose rails are all disposed edgewise had their transverse curvature tending toward the shape depicted in FIG. 5.

Glass sheets bent on apparatus such as depicted in FIGS. 1 to 3 were vastly superior in stress pattern and in reverse marginal sag to those produced on molds having ledge type shaping surfaces of sufficient thickness to maintain the glass sheet in bottom edge corner contact only after bending.

The present invention also has provided improved results when employed on tempering molds used for bending glass sheets to shallow curvatures and subsequently tempering, wherein the curvature imparted to the glass sheet is too shallow to necessitate sectionalizing the mold. As shown in FIG. 4, a typical skeletonized mold comprises straight rails 64 and 65 extending along opposite sides of the mold. Their straight upper edges 66 and 67 are apertured in the form of notches or serrations. Upper edges 66 and 67 form the thin longitudinal side edges of the shaping surface. Flatwise disposed rails 68 and 69 having gently curved upper surfaces interconnect the laterally opposite longitudinal extremities of longitudinally extending side rails 64 and 65. The inner edges of end rails 68 and 69 are apertured, that is, provided with serrations or notches 70.

Longitudinally extending side rails 64 and 65 are connected to longitudinally extending reinforcement members 71 and 72, respectively, through spaced webs 73. The flatwise disposed end rails 68 and 69 are reinforced at their outer edges with downwardly extending vertical reinforcements 74.

Extension arms 75 extend longitudinally outwardly from the longitudinally extending reinforcing members 71 and 72. Each of the extension arms 75 has its undersurface notched at 76 to be received by a support bar of a mold support carriage (not shown).

In the FIG. 4 embodiment, the portion of the glass sheet margin initially supported on rails 64 and 65 is to remain flat and the axis of curvature is parallel to these rails. Flatwise disposed rails 68 and 69 define a shallow curve (about 60 inch radius, for example) extending between rails 64 and 65. Rails 68 and 69 have surfaces darkened by oxidation at elevated temperatures to promote black body characteristics and are sufficiently thin to have less thermal capacity than the supported or adjacent edge portion of the glass sheet. This causes the margin of the glass sheet overlying rails 68 and 69 to sag downwardly into flatwise contact therewith, thus providing flatwise marginal contact with the critical curved portions of the shaping surface. In this embodiment, since the glass is bent to a shallow curvature, its length is shortened very slightly, thus necessitating such a small overhang as to result in substantially no reverse edge sag along the straight side edges of the glass sheet.

In both the above embodiments, the crux of the invention is to dispose flatwise critical portions of the shaping surface capable of making flatwise contact with the marginal edge portions of the shaping surface in the critical regions adjacent the axis of curvature where selective glass sheet softening and support is required. Therefore, it is necessary that the critical portions of the shaping surface have black body characteristics and less thermal capacity than the contacted glass sheet portions. By way of example, in bending plate glass sheets of conventional soda-lime-silica compositions containing up to about 0.6 percent by weight of iron oxide of ¼ inch nominal thickness, flatwise disposed rails of 18–8 stainless steel should have a thickness not exceeding $\frac{1}{16}$ inch, and preferably about .05 inch. Stainless steel flatwise disposed mold rails having a thickness of at least ⅛ inch retard the rate of heating or cooling a supported edge of a glass sheet having a nominal thickness of ¼ inch.

While typical embodiments of constructions illustrating the present invention have been described, the inventions provided by these constructions are not necessarily limited to the specific structural elements of the illustrative embodiments, but are limited only by the claimed subject matter which follows.

What is claimed is:

In the method of bending a flat glass sheet into conformity with an outline, stainless steel rail-type shaping surface of concave elevation curved to the shape desired for the glass sheet after bending by heating said glass sheet to an elevated temperature at which it sags into conformity with said curved shaping surface, the improvement comprising supporting said flat glass sheet on said shaping surface with a portion of its margin in bottom edge corner to surface contact with a flatwise disposed portion of said rail-type shaping surface having a thickness sufficiently less than the thickness of the supported glass sheet so that said flatwise disposed shaping surface portion has a thermal capacity sufficiently less than that of said marginal portion of said glass sheet adjacent thereto that its temperature increases at a faster rate than that of the portion of the supported glass sheet during the heating portion of the bending cycle and decreases at a faster rate than that of said glass sheet portion during the cooling subsequent to bending, heating said glass sheet and said shaping surface until said glass sheet reaches the glass softening point and the supported marginal portion of said supported glass sheet sags into flatwise contact with said portion of said shaping surface, and cooling said bent glass sheet simultaneously with said shaping surface after said supported marginal portion is in flatwise contact with said shaping surface portion disposed flatwise.

References Cited in the file of this patent

UNITED STATES PATENTS

| | | |
|---|---|---|
| 2,608,030 | Jendrisak | Aug. 26, 1952 |
| 2,633,673 | Bamford et al. | Apr. 7, 1953 |
| 2,688,210 | Jendrisak | Sept. 7, 1954 |
| 2,827,738 | McKelvey | Mar. 25, 1958 |
| 2,872,756 | Jendrisak | Feb. 10, 1959 |
| 2,897,632 | Fowler et al. | Aug. 4, 1959 |
| 2,920,423 | Carson et al. | Jan. 12, 1960 |
| 2,925,688 | Carson | Feb. 23, 1960 |
| 2,936,550 | Carson | May 17, 1960 |
| 2,940,222 | Davidson et al. | June 14, 1960 |

FOREIGN PATENTS

| | | |
|---|---|---|
| 209,314 | Australia | July 19, 1957 |